D. GOODNOW.
JACK REST.
APPLICATION FILED APR. 8, 1912.
1,120,809.
Patented Dec. 15, 1914.
2 SHEETS—SHEET 1.
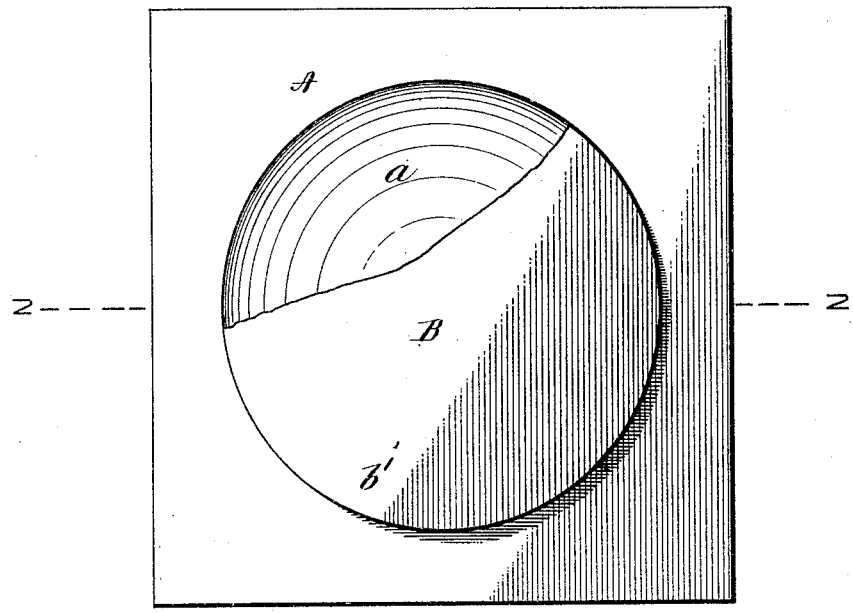
Fig.-1-
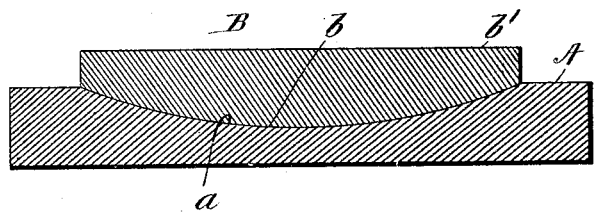
Fig.-2.
WITNESSES:
M. E. Flaherty.
A. E. O'Brien.
INVENTOR:
Daniel Goodnow
By
Ernest Hayes
his attorneys.

D. GOODNOW.
JACK REST.
APPLICATION FILED APR. 8, 1912.

1,120,809.

Patented Dec. 15, 1914.

2 SHEETS—SHEET 2.

WITNESSES:
M. E. Flaherty.
A. O'Brien.

INVENTOR:
Daniel Goodnow.
By
his attorneys.

UNITED STATES PATENT OFFICE.

DANIEL GOODNOW, OF BOSTON, MASSACHUSETTS.

JACK-REST.

1,120,809.  Specification of Letters Patent.  Patented Dec. 15, 1914.

Application filed April 8, 1912. Serial No. 689,143.

*To all whom it may concern:*

Be it known that I, DANIEL GOODNOW, of Boston, in the county of Suffolk and State of Massachusetts, a citizen of the United States, have invented a new and useful Improvement in Jack-Rests, of which the following is a specification.

My improvement consists in a self-leveling jack support especially useful to support a jack when lifting an automobile axle in replacing a wheel or tire, although it may be used for other like purposes.

My device is intended to form a firm support or platform for an ordinary jack. It comprises a floor member and a socket member on which the floor member rests, the two being self-adjusting so that while the socket member may rest on a rough or slanting bit of road, the floor member may be set at any angle thereto so as to present a firm level flooring on which the bottom of the jack may rest, thus giving a firm support to the jack and supporting it in a vertical position.

My invention will be understood by reference to the drawings in which—

Figure 3:
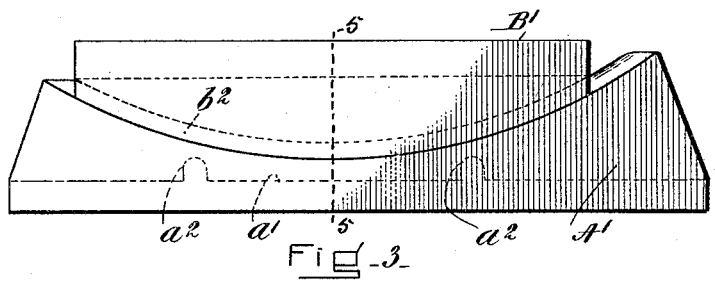
Figure 4:
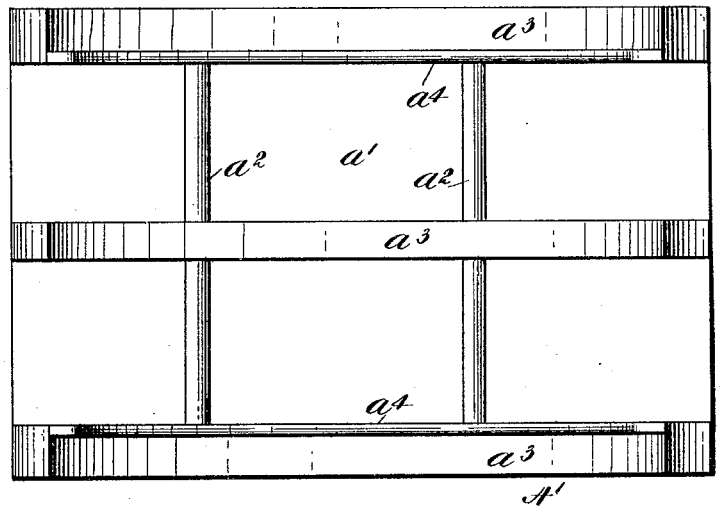

Figure 1 is a plan, part of the flooring being broken away to indicate the top surface of the socket member. Fig. 2 is a section on line 2—2 of Fig. 1. Fig. 3 is a side elevation of a modification. Fig. 4 is a plan of the modified socket member, and Fig. 5 a section on line 5—5 of Fig. 3.

In the form of my invention shown in Figs. 1 and 2 A is the socket member and B is the floor member. As shown the socket member A is flat on its under surface and substantially square and of sufficient area to form a secure base for the jack, and of sufficient thickness for strength. The socket member is provided with a saucer-shaped cavity $a$ into which fits a corresponding convex surface $b$ which forms the under side of the floor member B. The upper surface $b^1$ of the floor member is sufficient in area to receive the bottom of the jack. In practice the socket member A is laid on the ground and the floor member B placed in the recess $a$ and adjusted in place so that the upper surface $b^1$ thereof shall be substantially horizontal. On this surface the jack is placed so that notwithstanding the fact that the socket member is at a considerable angle to the horizon the jack will be vertical and thus can not only act on the axle with a direct upward thrust, but will also give a firm support to the axle when the jack has lifted the wheel off the ground.

Figure 5:
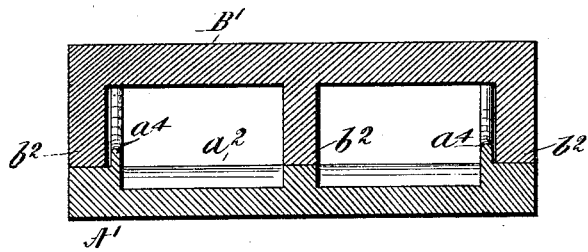

In the modification shown in Figs. 3, 4 and 5 the action is the same, but the floor has a cradle adjustment. The socket member in this case is lettered $A^1$ and the floor member $B^1$. For the purpose of reducing weight without loss of strength I prefer to provide the cradle or socket portion $a^1$ of the socket member with cross ribs $a^2$, the socket portion proper being provided with concave rests $a^3$, one edge of each outer rest being provided with a flange $a^4$. The floor member $B^1$ is provided with rockers $b^2$ which rest on the rests $a^3$, the flanges $a^4$ serving to prevent the rockers from sliding off laterally. In practice the socket member is so placed in this case that its rests will be parallel with the greatest inclination to the road; the floor member is placed on it and with its upper surface $b^1$ adjusted level as before. The jack is then placed on its upper surface $b^1$ and put into operation.

Such a device as above described may be otherwise constructed, its purpose being to provide a support for the jack which need not be used in the garage or stable where the jack can rest on a level floor, but can be brought into use when necessary. It is preferably made of cast iron and need not be of great size or weight. It can be easily packed in an automobile and requires but little care in adjustment or handling. I have shown it in two simple forms. Others may occur to those skilled in the art, the essence of the invention lying in the adjustment of the upper or floor surface of the device with the under surface which is intended to rest on the ground so as to maintain the jack in vertical position when in use. While the under surface of the socket member is shown to be flat it may be otherwise suitably shaped to remain in fixed position on the ground when in use, if thought best.

What I claim as my invention is:—

1. A portable jack rest comprising two plates of substantially equal thickness, each plate having a series of ribs, the ribs on one plate being adapted to rest on the ribs on the other plate, the contacting surfaces of the ribs on one plate being rocker-shaped whereby said plates may be adjusted to present a horizontal upper surface upon which a jack may rest.

2. A device of the kind described comprising two members adapted to rest one on the other, the supporting member having a series of rests, and the upper member having a corresponding series of rockers adapted to rest upon said rests whereby the angle of the two members may be adjusted with relation to each other, one or more of said rests being provided with flanges to prevent lateral displacement of said rockers thereon.

DANIEL GOODNOW.

Witnesses:
 HELEN M. FARRELL,
 RUSSELL J. GOODNOW.

Copies of this patent may be obtained for five cents each, by addressing the "Commissioner of Patents, Washington, D. C."